Patented Aug. 29, 1939

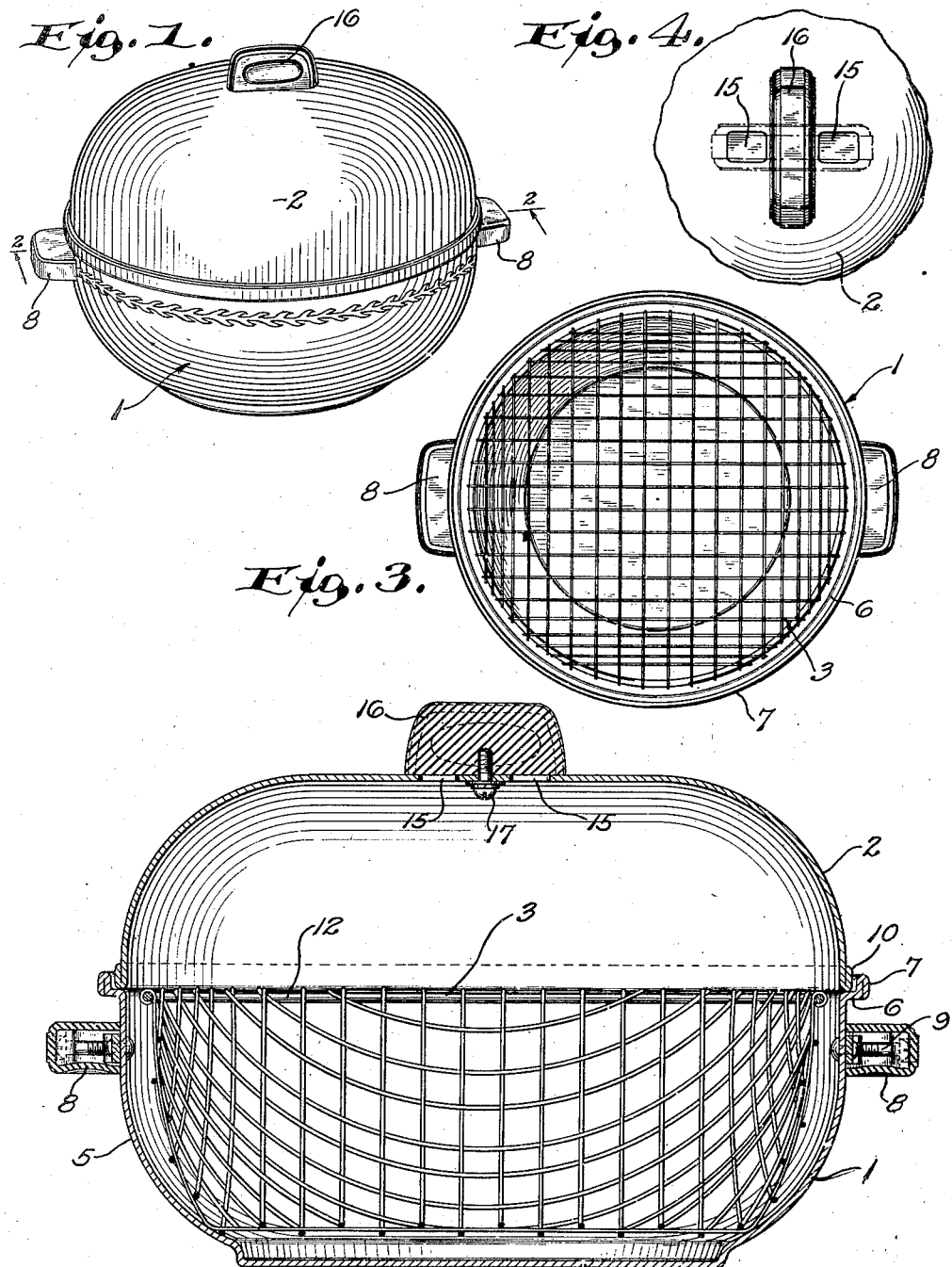

2,170,904

UNITED STATES PATENT OFFICE 2,170,904

SERVING OVEN

Ralph N. Kircher, West Bend, Wis., assignor to West Bend Aluminum Company, West Bend, Wis., a corporation of Wisconsin Application August 6, 1938, Serial No. 223,461

1 Claim. (Cl. 53—6)

This invention relates to an improvement in cooking utensils and more particularly to a serving oven designed to cook or heat food and also to facilitate the serving thereof.

Among the objects of the invention is to provide a utensil of this character which is capable of cooking or baking foods or reheating, recrisping or refreshening the same and yet is so constituted and of such pleasing appearance that it graces as well as facilitates the serving of food on the table.

Another object is to provide a device of this character which is of simple, compact construction, reliable and efficient in use, so much so that it will prevent scorching or burning of the food while quickly and properly cooking the same, and yet is easy and economical to manufacture.

Other objects and advantages reside in certain novel features of the construction, arrangement and combination of parts which will be hereinafter more fully described and particularly pointed out in the appended claim, reference being had to the accompanying drawing forming a part of this specification, and in which:

Figure 1 is a perspective view of a serving oven embodying the present invention;

Figure 2 is a view thereof partly in diametrical vertical cross section and partly in elevation;

Figure 3 is a view in top plan of the base section of the utensil with the wire basket therein; and Figure 4 is a fragmentary view in top plan showing the combined knob and vent closure in its open or venting position.

Referring to the drawing, it will be seen that the serving oven comprises generally a base section 1, a cover section 2, and a wire basket 3.

The base section and the cover section are generally of the form of a salad bowl and preferably are constructed of aluminum or other metal of high thermo-conductivity.

The base section 1 includes a bottom 4 and an integral bowl-like body portion 5 provided around its upper open end with an outwardly directed annular shoulder or seat 6 surrounded by an upstanding double flange or rim 7. Handles of "Bakelite" or other heat insulating material are secured to diametrically opposite portions of the body 5 of the base section by means of suitable fastening devices designated generally at 9.

The cover section 2 is also in the form of an inverted bowl and has its margin beaded or reinforced by doubling back the material of the cover as indicated at 10. The cover section is so dimensioned that its beaded edge 10 is designed to rest on the seat 6 and fit snugly within the flange or rim 7 of the base.

The wire basket 3 consists of a multiplicity of crossed wire elements which are crimped and soldered together at the points of crossing and are clinched about a top ring 12 of round wire stock. The wire basket is shaped and dimensioned so as to fit nicely within the base section and yet except for the line of contact of the margin of its bottom with the body of the base section, is spaced from the walls of the base section a slight distance, preferably not less than one-eighth inch and not more than three-fourths inch.

In the flat top portion of the cover two vent holes or slots 15 are provided and they are shown as being alined and spaced from the center of the top. A combined knob and vent closure 16, which may also be of "Bakelite" or similar heat insulating material, is interconnected with the center of the top by means of a friction pivot 17 so that it serves not only as a means to facilitate handling of the cover but also may be turned to overlie and close the vent holes, or if adjusted to the position shown in full lines in Figure 4, will leave the vent holes unobstructed and consequently vent the interior of the utensil.

A device of this character may be placed on the top of a gas flame or over the electric heating element of an electric stove, or any other suitable similar source of heat. The heat is directly applied to the base of the cover section and due to the high thermo-conductivity of the material of the base and cover sections is transmitted into the interior of the utensil and highly heats the same. The food being placed in the wire basket is maintained out of contact with the highly heated walls of the oven and consequently will not be scorched or burned. It is practical and convenient to use a serving oven of this character for baking potatoes on top of the stove, warming up freshly baked buns, rolls, muffins or the like, crisping crackers for soup, crisping cereals of the biscuit variety, freshening "left-over" baked goods. In fact, moisture can be added to the food if this is desired by placing a small amount of water in the base section, the level of which will be below the bottom of the wire basket, and then closing the vent while the oven is on the top of the stove. The device is so conveniently handled and so readily portable and of such graceful appearance that it may be placed on the table with the food therein and the food conveniently held in the device and served directly therefrom. Hence it keeps freshly baked goods hot on the table and it is very effective in retaining heat of food prepared in batches, such as waffles, pancakes, french fries, peanuts or popcorn.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claim.

The invention claimed is:

A serving oven of the character described comprising complementary base and cover sections, each including a bowl-like body portion open at one end and closed at its other end by an integral end wall, the margins of the open ends of the sections having interfitting formations whereby in use the cover section is securely supported and centered on the base section, said base and cover sections being constituted of metal of high thermo-conductivity, a wire basket disposed in the base section and having the corner around its bottom engage with the sloping wall of the bowl-like body of the base section to maintain the foraminated walls of the basket otherwise out of contact with the walls of the base section, said basket being adapted to receive food and maintain the same spaced from and out of direct contact with the walls of the base section and yet exposed to the heat conducted through or radiating from the walls of the sections, and handles of insulating material projecting outwardly from the exterior of the base section to facilitate the handling of the oven.

RALPH N. KIRCHER.